UNITED STATES PATENT OFFICE.

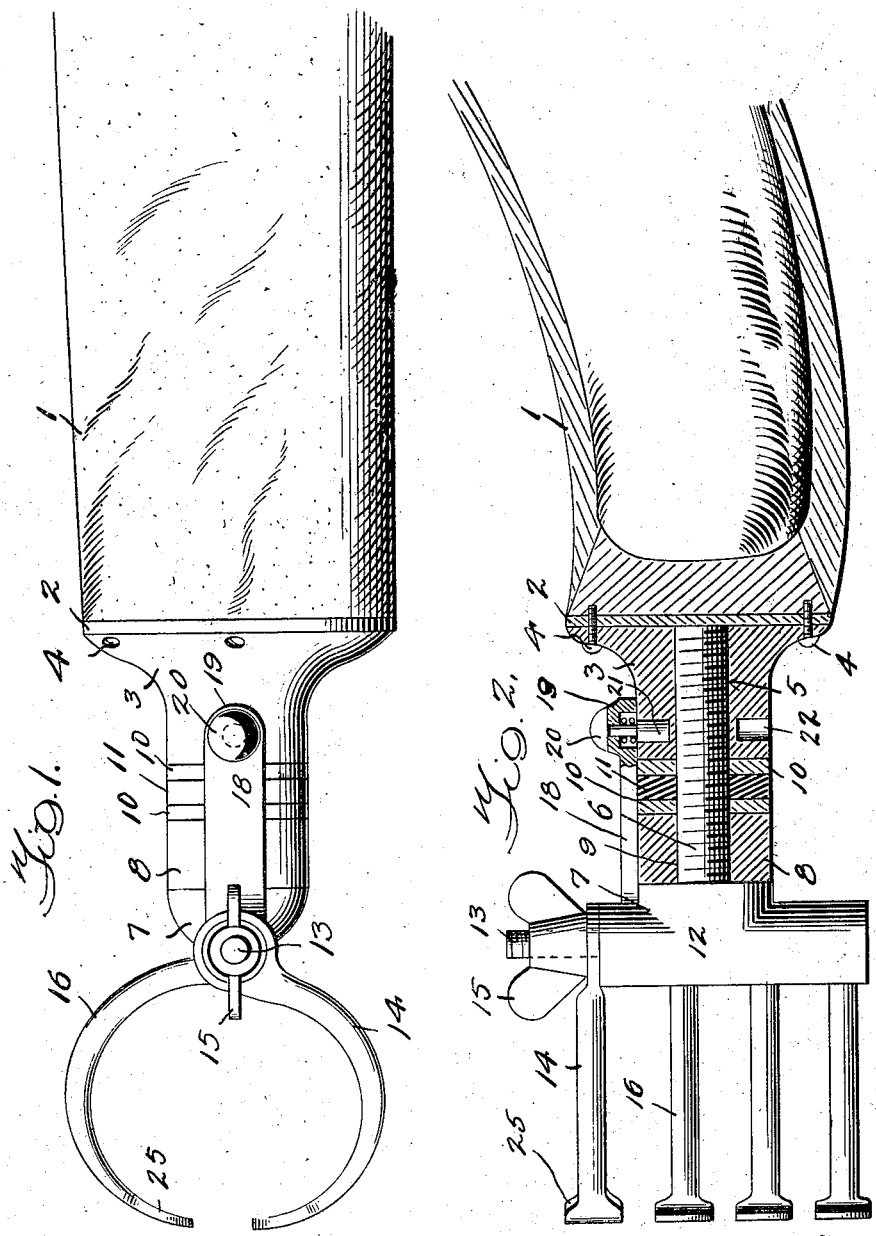

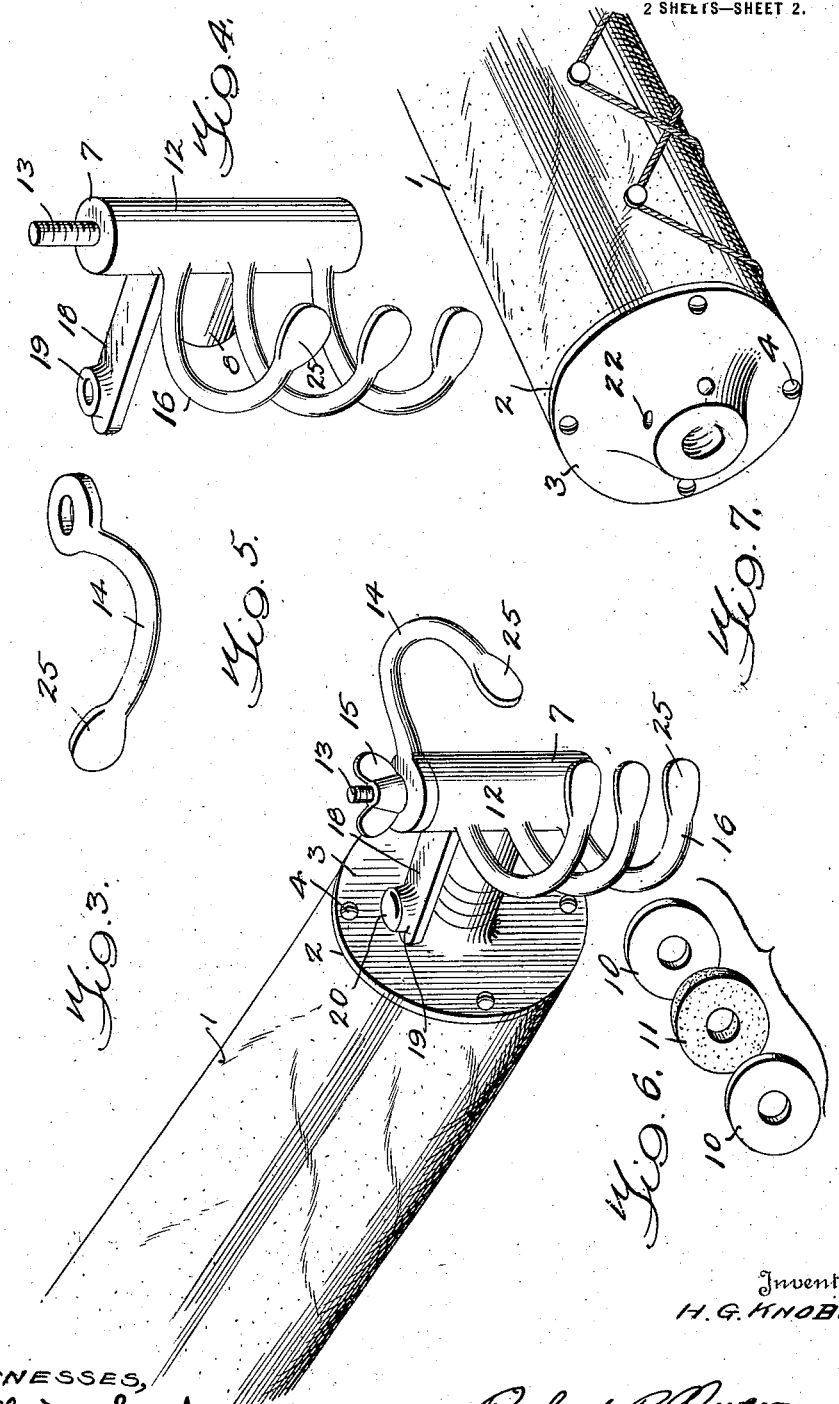

HENRY G. KNOBEL, OF NEW CANAAN, CONNECTICUT.

ARTIFICIAL HAND.

1,426,481. Specification of Letters Patent. Patented Aug. 22, 1922.

Application filed March 25, 1922. Serial No. 546,728.

*To all whom it may concern:*

Be it known that I, HENRY G. KNOBEL, a citizen of the United States, residing at New Canaan, in the county of Fairfield and State of Connecticut, have invented certain new and useful Improvements in an Artificial Hand, of which the following is a specification.

The present invention generically relates to artificial body members and more specifically it comprehends an improved construction of mechanical hand, designed to firmly grasp various objects, and otherwise replace, in so far as possible, the manifold functions of the amputated member.

Another important object of the invention is to generally improve upon artificial hands of this nature by providing a device which will be extremely simple, and efficient, inexpensive to manufacture, reliable in operation and well adapted to the purpose for which it is designed.

Another important object of the invention is to provide a hand rotatable in relation to its support and means for locking the same against rotation when so desired.

With the above and numerous other objects in view, as will appear as the description progresses, the invention resides in certain novel features of construction, and the combination and arrangement of parts as will be hereinafter more fully described and claimed.

In the drawing:—

Figure 1 is a top plan of the artificial hand embodying my invention,

Figure 2 is a side elevation thereof, a portion being shown in section,

Figure 3 is a perspective thereof,

Figure 4 is a perspective of the body of the hand,

Figure 5 is a perspective of the thumb claw,

Figure 6 is a perspective showing the washers used in conjunction with the device, and Figure 7 is a perspective of the wrist plate showing the same attached to the arm socket.

Referring to the drawing in detail it will be seen that the arm socket 1 is adapted to receive the forearm and to be laced thereon and as this socket does not form part of my improvement it is to be understood that any desired structure may be used. A plate 2 is disposed at the end of the socket 1 and acts as a washer between the wrist member 3 and the socket 1. This wrist member 3 is firmly held in place preferably by a plurality of screws 4. The wrist member is provided with a longitudinally extending threaded bore 5 which receives the threaded pin or bolt 6. The body 7 is substantially T-shape and its shank 8 is provided with a threaded bore 9 for receiving the end of the bolt 6 and the three washers 10 and 11 are disposed between the shank 8 and the wrist member 3 it being noted that the washer 11 is preferably formed of rubber or some such elastic material. The head 12 of the body 7 has a reduced threaded extension 13 at one end for receiving the thumb claw 14 which is bent throughout its length and may be locked against rotation by the wing nut 15 on the threaded extension 13. A plurality of finger claws 16 are formed integrally with the head 12 and are curved throughout their length concentric with each other and oppositely from the thumb claw 14 so that an object may be grasped between the thumb claw 14 and the finger claws 16 as will be readily understood. An arm 18 extends from the head parallel with and adjacent to the shank 8 so as to terminate in an enlargement 19 which is recessed on its bottom face. A headed pin 20 projects into the recess and terminates in a bolt 21 adapted to rest in one of the indentures 22 arranged about the end of the wrist member 3. A spring is situated in the recess for pressing the bolt in these indentures 22. This structure prevents accidental rotation of the body 7 in relation to the wrist 3.

Each of the claws 14 and 16 terminate in flat end members 25 which have rounded edges thus allowing these claws to grasp effectively a large number of articles of different construction and minimizing at the same time the danger of injuring said articles.

Although I have described my invention with some degree of particularity, it is to be understood that many changes may be made in the details of construction and in the combination and arrangement of parts without departing from the scope of the invention as hereinafter claimed.

Having thus described my invention what I claim as new is:—

1. An artificial hand comprising a wrist member, a body member comprising finger claws mounted rotatably on the wrist member, an arm extending from the member toward the wrist member and terminating adjacent thereto, a spring pressed plunger carried in the terminal of the arm, said wrist member provided with a plurality of indentures for receiving said plungers.

2. An artificial hand of the class described comprising in combination a wrist having a threaded bore therein, a threaded bolt having one end received in said threaded bore, a body member having a threaded bore for receiving the other end of said bolt, a plurality of fixed curved finger claws on the body member, a reduced extension provided with threads mounted on the end of said body portion, a thumb claw curved throughout its length in an opposite direction from said claw fingers rotatably mounted on said extension and a wing nut on the extension for locking the thumb claw against rotation when desired.

3. An artificial hand of the class described comprising in combination a wrist having a threaded bore therein, a threaded bolt having one end received in said threaded bore, a body member having a threaded bore for receiving the other end of said bolt, a plurality of fixed curved finger claws on the body member, a reduced extension provided with threads mounted on the end of said body portion, a thumb claw curved throughout its length in an opposite direction from said claw fingers rotatably mounted on said extension and a wing nut on the extension for locking the thumb claw against rotation when desired and an arm fixed to the body portion and extending toward the wrist portion terminating adjacent thereto in a recessed enlargement, a spring pressed bolt mounted in said recessed enlargement, said wrist portion provided with a series of apertures for receiving said spring pressed bolt whereby the body portion may be locked against rotation in relation to the wrist portion.

In testimony whereof I affix my signature in presence of two witnesses.

HENRY G. KNOBEL.

Witnesses:
A. D. BURDICK,
BERNARD F. GETTA.